US012652352B1

(12) United States Patent
Venables et al.

(10) Patent No.: US 12,652,352 B1
(45) Date of Patent: Jun. 9, 2026

(54) SYSTEM AND METHOD OF HANDLING COMMUNICATIONS USING VISIBLE QUEUE

(71) Applicant: SymmetriCall Inc., Miami, FL (US)

(72) Inventors: Kenneth Chad Venables, Las Vegas, NV (US); Scott David Hazard, Pinecrest, FL (US)

(73) Assignee: SymmetriCall Inc., Miami, FL (US)

( * ) Notice: Subject to any disclaimer, the term of this patent is extended or adjusted under 35 U.S.C. 154(b) by 0 days.

(21) Appl. No.: 19/303,105

(22) Filed: Aug. 18, 2025

Related U.S. Application Data

(60) Provisional application No. 63/774,000, filed on Mar. 18, 2025.

(51) Int. Cl.
*H04M 3/523* (2006.01)
*H04M 3/51* (2006.01)

(52) U.S. Cl.
CPC ......... *H04M 3/523* (2013.01); *H04M 3/5166* (2013.01)

(58) Field of Classification Search
CPC ............................ H04M 3/523; H04M 3/5166
See application file for complete search history.

(56) References Cited

U.S. PATENT DOCUMENTS

| | | | |
|---|---|---|---|
| 7,068,775 B1 * | 6/2006 | Lee ........................ | H04M 3/428 |
| | | | 379/265.11 |
| 9,065,915 B1 * | 6/2015 | Lillard .............. | H04M 3/42382 |
| 12,205,577 B1 | 1/2025 | Kim et al. | |
| 2018/0260834 A1 | 9/2018 | Stuckey et al. | |
| 2024/0296606 A1 | 9/2024 | Smetanin et al. | |

* cited by examiner

*Primary Examiner* — Amal S Zenati

(74) *Attorney, Agent, or Firm* — Womble Bond Dickinson (US) LLP

(57) ABSTRACT

System and method of processing communication requests are disclosed. The method can include receiving communication requests from a plurality of user devices of users, where the communication requests comprise respective user statuses; queuing the communication requests into an incoming communication queue; determining whether at least one agent of a plurality of agents is available to service the communication requests from the incoming communication queue; in response to determining that no agent is available to service the communication requests, queuing the communication requests into an interactive voice response (IVR) queue; and in response to determining that the at least one agent is available to service the communication requests, dequeuing one or more communication requests from the incoming communication queue in an order of one or more priorities respectively assigned to the communication request(s) based on one or more user statuses of the communication request(s), to service the communication request(s).

20 Claims, 9 Drawing Sheets

400

START

Receive and register communication request from user devices of users in an incoming queue with full access and visibility to all agents; the incoming queue is coupled to an IVR system comprising IVR code; the communication request comprise respective user status, that may be enhanced by an auto logic. — 410

For each communication request determine whether at least an agent is available to service the communication request; in response to determining that at least the agent is available, enable the agent to dequeue the request and pick it up from the incoming queue. — 420

In response to determining that no agent is available to service the communication request, connect the communication request to an instance of an IVR code from the coupled IVR system to engage with the user. All the communication requests connected to the IVR code is in an IVR queue that is part of the incoming queue. — 430

In response to determining that at least an agent, who was previously engaged, has become available to service the communication requests in the incoming queue that includes the IVR queue, enable the available agents to dequeue and pick up the communication request(s) based on an order of one or more respective priorities assigned to the communication request(s) assigned to the communication request(s) to service the communication request(s). — 440

END

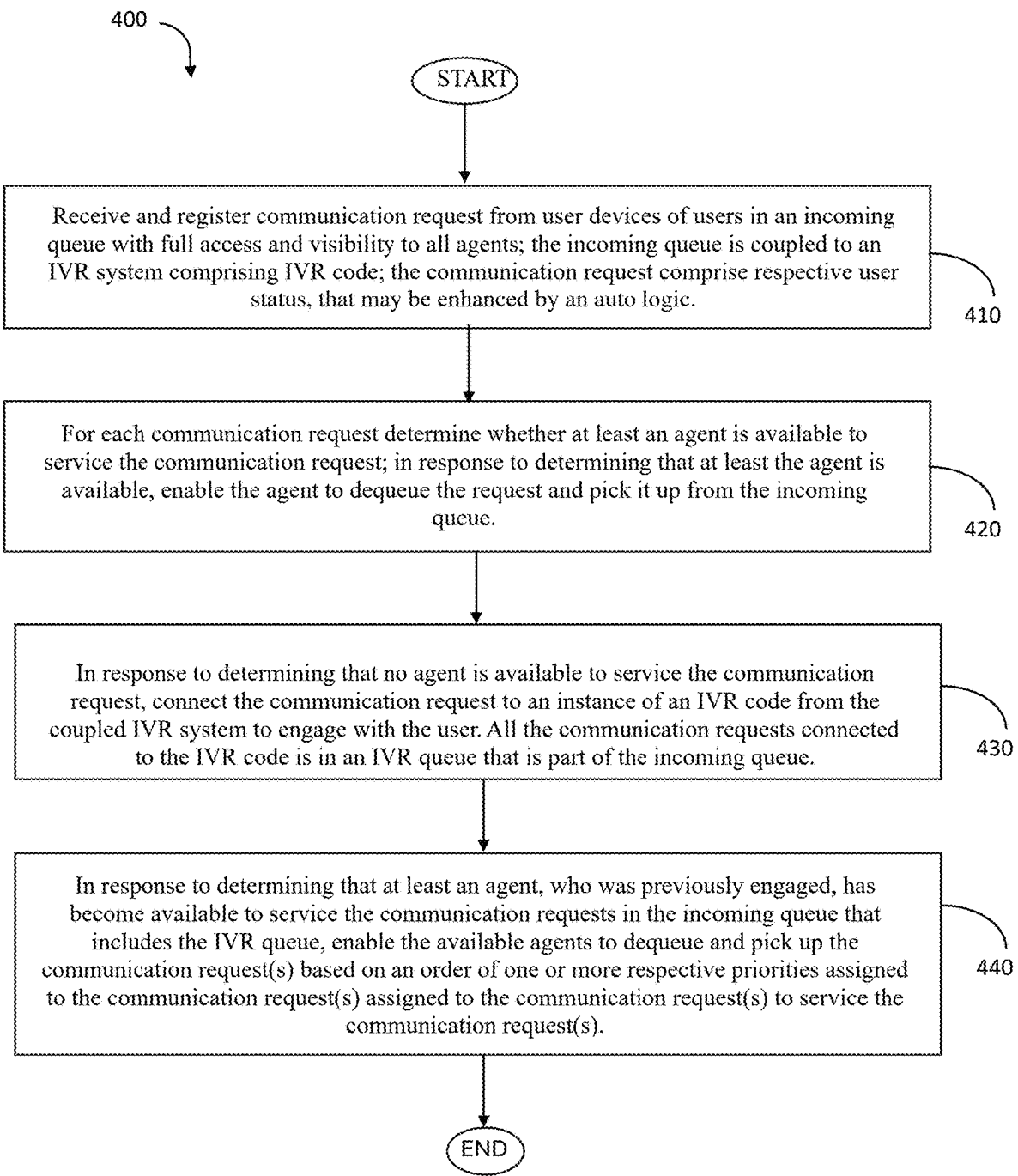

400

START

Receive and register communication request from user devices of users in an incoming queue with full access and visibility to all agents; the incoming queue is coupled to an IVR system comprising IVR code; the communication request comprise respective user status, that may be enhanced by an auto logic.

410

For each communication request determine whether at least an agent is available to service the communication request; in response to determining that at least the agent is available, enable the agent to dequeue the request and pick it up from the incoming queue.

420

In response to determining that no agent is available to service the communication request, connect the communication request to an instance of an IVR code from the coupled IVR system to engage with the user. All the communication requests connected to the IVR code is in an IVR queue that is part of the incoming queue.

430

In response to determining that at least an agent, who was previously engaged, has become available to service the communication requests in the incoming queue that includes the IVR queue, enable the available agents to dequeue and pick up the communication request(s) based on an order of one or more respective priorities assigned to the communication request(s) assigned to the communication request(s) to service the communication request(s).

440

END

FIG.4

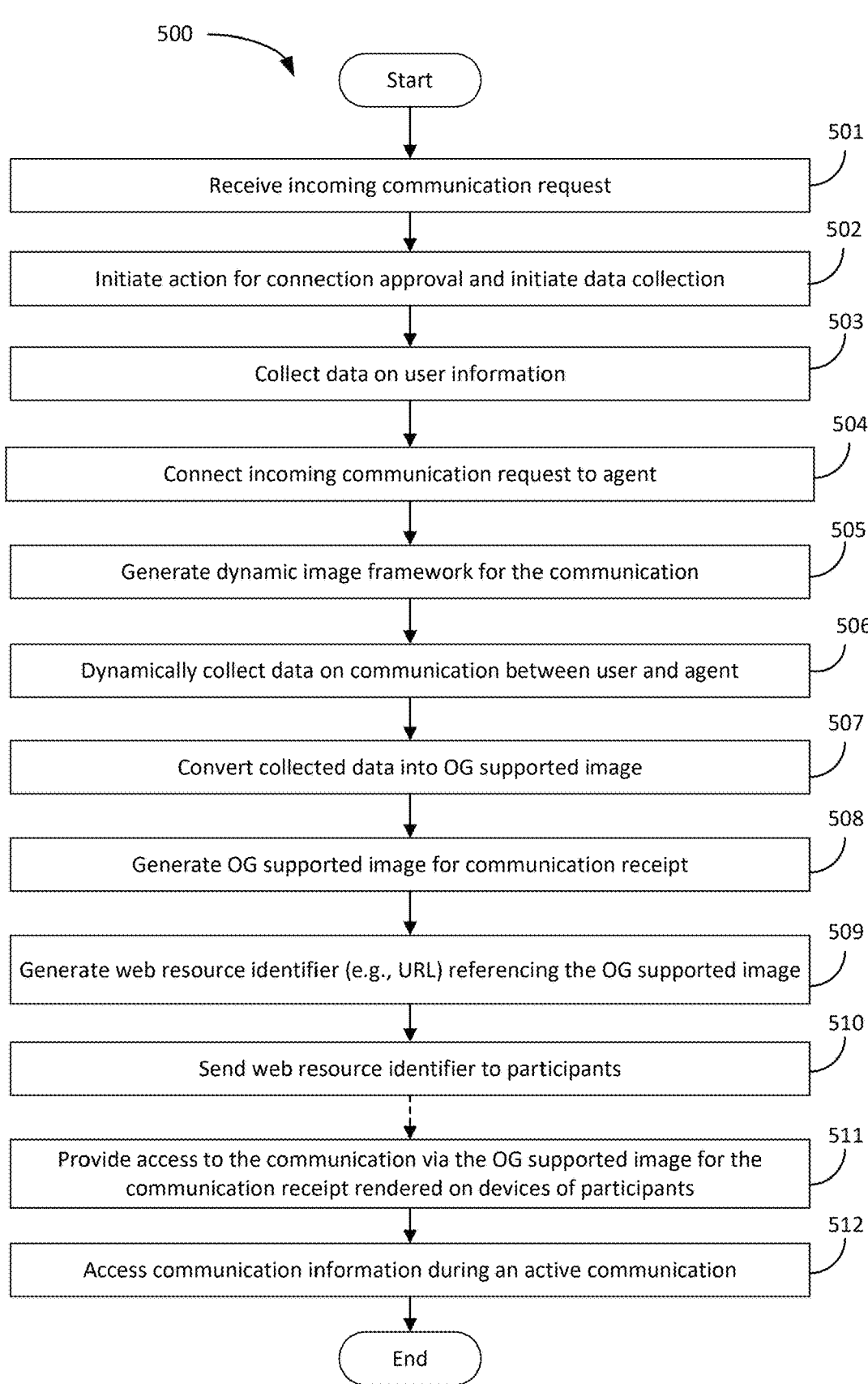

500

Start

Receive incoming communication request — 501

Initiate action for connection approval and initiate data collection — 502

Collect data on user information — 503

Connect incoming communication request to agent — 504

Generate dynamic image framework for the communication — 505

Dynamically collect data on communication between user and agent — 506

Convert collected data into OG supported image — 507

Generate OG supported image for communication receipt — 508

Generate web resource identifier (e.g., URL) referencing the OG supported image — 509

Send web resource identifier to participants — 510

Provide access to the communication via the OG supported image for the communication receipt rendered on devices of participants — 511

Access communication information during an active communication — 512

End

*FIG. 5*

SYSTEM AND METHOD OF HANDLING COMMUNICATIONS USING VISIBLE QUEUE

CROSS-REFERENCE TO RELATED APPLICATIONS

This application claims the benefit of U.S. Provisional Application No. 63/774,000 filed on Mar. 18, 2025, the disclosure of which is incorporated herein by reference.

TECHNICAL FIELD

This application generally relates to interactive communication systems. More specifically, embodiments of the application relate to system and method of handling communications using a visible queue.

BACKGROUND

Currently, transaction receipts serve as a record of a transaction, allowing customers to make returns or exchanges on a product. Without a receipt, there is no proof of the purchase, and the customer cannot return or exchange the item in question.

Generally, there are two types of transaction receipts. They are the sales receipt and the financial transaction receipt. They are generated as proof of a transaction after the transaction has been completed.

Transaction receipts allow businesses to keep track of multiple expense transactions and provide proof that a transaction occurred via a receipt book or with a spreadsheet. With transaction receipts, employees can create a reimbursement report, which is necessary for tax purposes and identifying potential taxable deductions. Similarly, transaction receipts allow financial institutions to have a record of and keep track of transactions that happen between the depositor and the institution.

The number of digital transactions or communications taking place over hand-held interactive devices, such as smartphones, and other messaging services, such as SMS (Short Message Service) or other messaging platforms, such as WhatsApp, Telegram, Skype, Discord, Viber, Signal, etc., has grown in volume and is currently in use to initiate and conduct transactions. Digital transactions using web-based apps, e.g., chat programs, also take place less frequently. Emails have also become an accepted means for financial transactions. Digital transaction receipts therefore provide a means for tracking these transactions. The digital transaction receipts today contain information that is necessary to record and confirm a transaction. Such information generally includes information on the parties to the transaction, date of the transaction, time of the transaction, location of the transaction, goods or services involved in the transaction, mode of financial component of transaction, etc.

Unfortunately, there is no capability exists today for dynamically generating a digital transaction receipt that comprises all the details or information that that take place during a transaction or communication. More specifically, there is no transaction receipt that can be saved as historical data having the details of all of the interactions between the parties to a transaction as it happens and there is also no easy way to access and search past transactions to understand what has taken place during a transaction for enabling efficient review and follow-up of the transaction. Such a capability will be extremely valuable if made available.

BRIEF DESCRIPTION OF THE DRAWINGS

FIG. 4 is a flow diagram illustrating an example process of processing communication requests according to an embodiment.

FIG. 5 is a flow diagram illustrating an example process performed by the system of FIG. 1 according to an embodiment.

DETAILED DESCRIPTION

Figure 1:
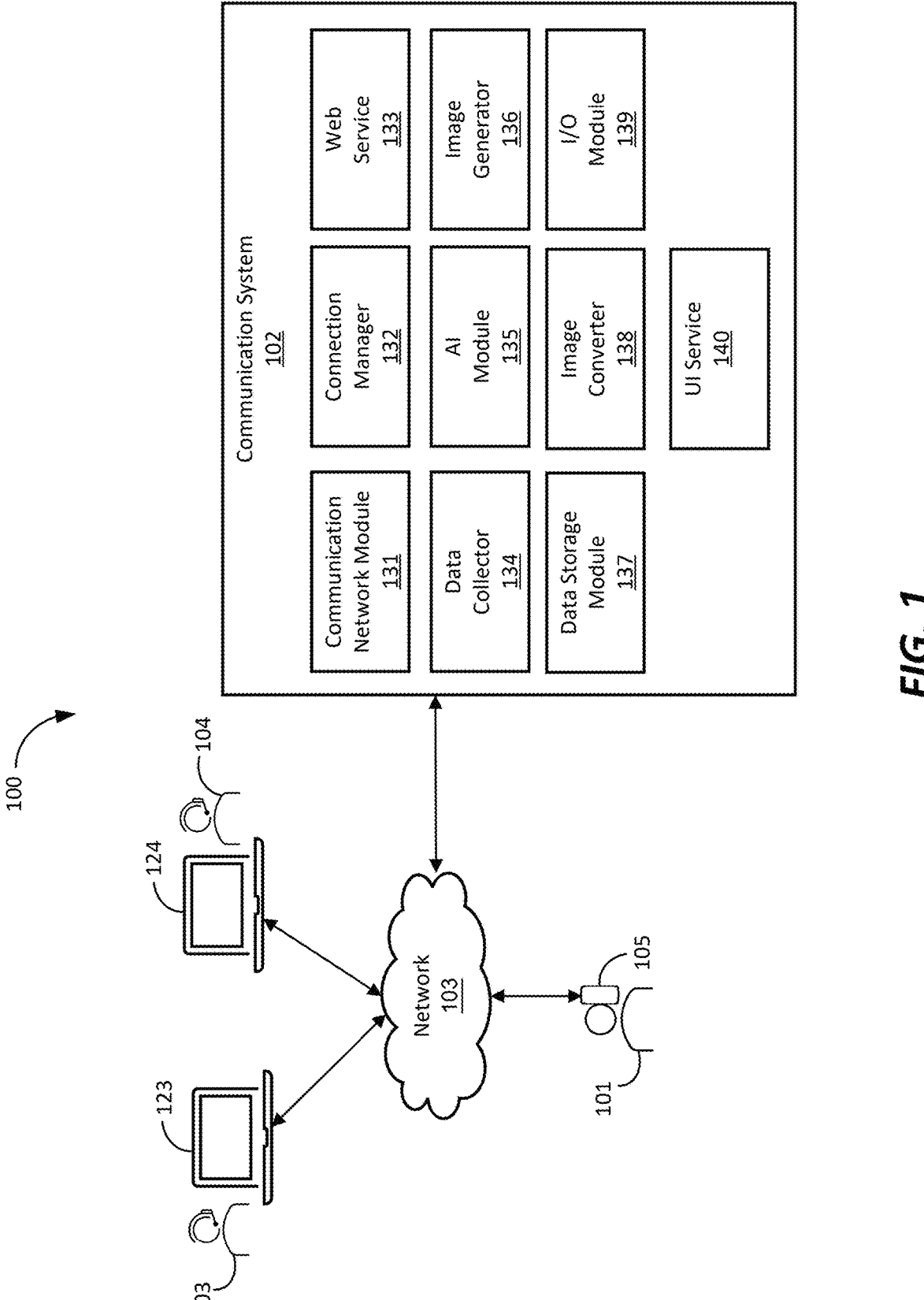
FIG. 1 is a block diagram illustrating an example interactive communication system according to an embodiment.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

According to some embodiments, system and method of handling communications or transactions in real-time are provided. For instance, the system can dynamically generate visual images in real-time, where the images can be made available to all users of an interactive communication for improved customer experience. For example, an image can be used as part of a transaction or communication receipt that enables ease of tracking and follow up on a particular communication. In an embodiment, data collected during the communication may be used to create a transaction or communication summary that may be part of the image or communication receipt. The image (e.g., vector image) and communication summary may be converted into a dynamic image in an open graph (OG) supported format, e.g., JPG, PNG, GIF, etc., where the dynamic image may serve as a communication receipt that confirms or evidences the communication.

In some embodiments, the data collected on the communication may be used to create a dynamic transcript of the interactive communication. The dynamic transcript may be a digital transcript or record of the interactive communication that can automatically or manually be updated during or after the interactive communication. In an embodiment, a web resource identifier, e.g., uniform resource locator (URL), referencing the dynamic transcript may be automatically generated and transmitted in real-time to the participants of the communication at completion of the communication. The web resource identifier may be provided as the communication receipt to enable the participants to access the dynamic transcript through a specific website, where the dynamic transcript may provide complete or additional details of the communication. The web resource identifier may act as a trigger that enables multimedia access of the dynamic image via a mobile messaging service (e.g., SMS, MMS, etc.), other messaging platforms such as WhatsApp®, Telegram®, Skype®, Discord®, Viber®, Signal®, etc., or social media platforms such as Facebook®, Instagram®, LinkedIn®, etc. The website accessed by the participants can provide real-time updates of the communication, such as a call or text. The communication receipt (web resource identifier) can also provide the capability to the participants to review and follow up on the communication.

Accordingly, embodiments of the application can be an enabler for small to medium enterprises, for example, to improve their customer interaction including providing access to existing clients (e.g., VIP clients) to agents of an enterprise, such as a call center agent, customer representative, customer support representative, customer service representative or agent, sales representative, technical support representative, etc. The enterprise can be any form of business, e.g., a drycleaning establishment, a restaurant, a mom-and-pop shop, a hair cutting saloon, etc., where the number of employees is small and management is intimately involved in the operation of the enterprise. The embodiments of the application also improve the customer satisfaction by reducing the time a known and existing customer has to take to access an agent to discuss an issue, enabling customers to follow up easily their interactions with the agent of the enterprise, and providing them with the capability to review their prior interactions with the enterprise.

As will be described in more detail herein below, embodiments of the application also provide a dynamically generated visual representations or images that enable the enterprise to have internal control on any incoming communication request (e.g., call or text message) that initiates an interaction with the enterprise and results in a transaction. The embodiments of the application are enabled to provide total visibility of a transaction to the agents by accepting the incoming initiation of interaction, the management of the enterprise and the customer or initiator of the transaction, and hence, provide a better customer experience to the customers of the enterprise. The dynamically generated visual images, for example, an OG supported image, such as PNG or JPG, can be captured in real-time, and made available to all the parties of a transaction or communication, as part of a communication receipt, during and/or at the close of the communication, for enabling ease of follow up. As previously described, a web resource identifier, e.g., URL, referencing a dynamic transcript may be automatically generated and transmitted in real-time to the participants of the communication at the completion of the communication. The web resource identifier may comprise a token of the communication that is provided as part of the communication receipt to enable the participants access the dynamic transcript via a specific website. The web resource identifier may enable multimedia access of the dynamic image via social media hooks, e.g., application programming interfaces (APIs) and additional URLs provided therein. The website accessed by the participants can provide real-time updates of the communication, such as a call or text. The communication receipt (web resource identifier) can also provide the capability to the participants to review and follow up on the communication.

In some aspects, method and system of processing communication requests are provided. The method can include receiving communication requests from user devices of users, where the communication requests comprise respective user statuses. All connection and communication requests are put into an incoming communication queue (also called an input queue) that may have an associated IVR system, and made visible and accessible to all users/agents, whether active or not. An auto logic may be used at the connection to enhance the user status based on the related importance and potential reason for call, plus suggest best agent to handle the connection. The method determines whether at least one agent is available to service the communication request in the incoming communication queue based on the visible status, if at least an agent is available the communication request is picked up by the agent and dequeued from the incoming communication queue and if no agent is available to service the communication request immediately, the communication connection request is added into an IVR queue (that may also be called IVR system queue) that is part of and associated with the incoming communication queue, where each of the communication requests not picked up gets connected to an instance of the IVR code for temporarily responding to the communication request connection, the order within the input queue after the pick-ups and dequeuing from the incoming communication queue of any of the communication requests by the agents, retains the full visibility and accessibility to all users/agents and with the assigned priority to the communication request based on the enhanced user status of the communication request. The remaining communication requests are retained in the incoming communication queue as an IVR queue that is part of the incoming communication queue. Each of the communication connection request in the IVR queue may be considered as an engaged connection for response, connected not to an agent but to the IVR system, where the IVR code use may be replicated for each communication connection in the IVR queue. In response to determining at any point in time that at least one agent is available to service the communication request(s) in the IVR queue, enabling the at least the agent to access the connections in the IVR queue and deque the communication request(s) from the IVR queue based on an order of one or more respective priorities assigned to the communication request(s), to service the communication request(s).

FIG. 1 is a block diagram illustrating an example interactive communication system according to an embodiment. Referring to FIG. 1, in one embodiment, system 100 includes, but is not limited to, a communication system 102, one or more user devices 105, and agent devices 123-124. User device(s) 105 and agent devices 123-124 may be a computer system (such as a desktop computer, laptop computer, or server computer system), mobile device (e.g., mobile phone, tablet, smartphone, smartwatch, smart glasses, health (activity) tracker, etc.), gaming system, vehicle infotainment system, or a combination thereof. Communication system 102 may also be one or more computing devices, such as one or more server computer systems, desktop computer systems, etc.

The communication system 102, user device 105, and agent devices 123-124 may be coupled to a network 103 and communicate with one another using any of the standard protocols for the exchange of information, including secure communication protocols. In one embodiment, the communication system 102, user device 105, and agent devices 123-124 may run on one Local Area Network (LAN) and may be incorporated into the same physical or logical system, or different physical or logical systems. Alternatively, the communication system 102, user device 105, and agent devices 123-124 may reside on different LANs, wide area networks, cellular telephone networks, etc. that may be coupled together via the Internet but separated by firewalls, routers, and/or other network devices. In one embodiment, communication system 102 may reside on a single server, or be distributed among different servers, coupled to other devices via a public network (e.g., the Internet) or a private network (e.g., LAN). It should be noted that various other network configurations can be used including hosted configurations, distributed configurations, centralized configurations, etc.

In an embodiment, communication system 102 may enable user 101, agent 103 and/or agent 104 to simultaneously connect to one another using user device 105 associated with user 101 and agent devices 123-124 associated with respondents or agents 103-104 to engage and complete the transaction. The communication system 102, at the start of a communication connection to an agent, may collect all the relevant data for an initial receipt in order to initiate, record and confirm a transaction. The transaction information may include information that identifies user 101, agent 103 and/or agent 104 (e.g., names, phone numbers, email addresses, etc.), date of the transaction, time of the transaction, location of the transaction, goods or services involved in the transaction, accepted mode of a financial component of the transaction, etc. Communication system 102 may further collect information of the communication, after the connection is established, that takes place during the transaction as communication record. The communication information may be used to dynamically generate a visual representation or image (e.g., vector image) of the interactive communication. The communication information may include names of user 101, agent 103 and/or agent 104, name of a business, purpose of the interactive communication, and/or date and time of the interactive communication.

In an embodiment, the visual representation may be converted into a searchable, storable dynamic image (e.g., OG supported image) that can be uploaded onto a website and can be shared with user 101, agent 103 and/or agent 104 (i.e., the parties involved in the interactive communication). For example, once the connection is established, data on the communication may continuously be collected and stored as part of a dynamic transcript. The dynamic transcript can automatically be updated by communication system 102 during or after the interactive communication. The dynamic transcript can also be manually updated by agent 103 and/or agent 104 during or after the interactive communication. In an embodiment, a web resource identifier, e.g., URL, referencing the dynamic transcript may be automatically generated by communication system 102 and transmitted in real-time to user device 105 and agent devices 123-124 at completion of the communication. The web resource identifier may be provided as a communication receipt to enable user 101, agent 103 and/or agent 104 to access the dynamic transcript through a specific website, where the dynamic transcript may provide complete or additional information of the communication.

In an embodiment, the web resource identifier may serve as a token referencing or pointing to the dynamic transcript. When user device 105 and agent devices 123-124 receive the web resource identifier, the web resource identifier may trigger each of those devices to access a website the web resource identifier points to (the dynamic transcript) and obtain (or fetch) website data (or metadata) of the website. For example, user device 105 and agent devices 123-124 may each read meta tag information (e.g., OG tag) from the website, such as the title, description, image, etc. The image in the meta tag information may be a dynamic image, as previously described. Based on the meta tag information gathered, the devices 105 and 123-124 may render the dynamic image, which may serve as a communication receipt evidencing the interactive communication between user 101, agent 103 and/or agent 104. User 101 and agents 103-104 may access the dynamic transcript by accessing the website using the provided (shared) web resource identifier. The dynamic image rendered on devices 105 and 123-124 may also provide the capability to user 101 and agents 103-104 to search for historical (prior related) communications, e.g., using a search bar in a messaging application (app), to help review and follow up as needed.

With continued reference to FIG. 1, communication system 102 may include, but not limited to, a communication network module 131, a connection manager 132, a web service 133, a data collector 134, an artificial intelligence (AI) module 135, an image generator 136, a data storage module 137, an image converter 138, and input/output (I/O) module 139, and a user interface (UI) service 140.

In an embodiment, communication network module 131 may enable user 101 (e.g., a customer of a business) to connect to and initiate a communication with system 102, e.g., dial in or send a message using a messaging app, to system 102. Module 131 may include an incoming communication queue 120, that may be enabled with an auto logic for enhancing any available user status. An interactive voice response (IVR) system (not shown) that may be coupled to the incoming communication queue 120, may use voice or keypad inputs to service received communication requests and direct the requests to available respondents or agents (e.g., agents 103-104) for processing the requests. In some embodiments, the IVR system coupled to the incoming communication queue 120, and forming a part of the module 131 may be an automated phone system that allows user 101 to interact with a computer-operated telephone system that may have a replicable IVR code to access information or navigate menus without speaking to a live agent. As discussed herein, the IVR system may generate an IVR queue of incoming communication requests (e.g., IVR queue 210 of FIG. 2C described in more detail herein below), not immediately dequeued from the incoming communication queue and responded to (e.g., calls not picked up by agents) that are registered into the incoming communication queue 120. The incoming communication queue and the IVR queue may comprise the enhanced status. The IVR system may send the requests to free agents at the agent devices 123-124 indicating an order the requests are received or indicating the order of priority assigned to the connections within the IVR queue.

In some embodiments, a visual (or UI) representation of the IVR queue may be presented to the agents 103-104. The agent 103 and/or agent 104 may dequeue and process the requests from the IVR queue when they are available. The requests may be queued into the IVR queue from the incoming communication queue 120, with the identification of the user initiating the communication (e.g., making the call) and the importance assigned to the user (priority assignment) by the enterprise as enhanced by the auto logic. For example, based on collected data that includes initial information about the communication (as described in more detail herein below with respect to data collector 134), the auto logic may determine that the communication request is critical and needs expedition. As such, the auto logic may elevate the user status of the communication request from a lower level to a higher level (e.g., from existing or preferred customer to VIP customer). Accordingly, the priority level assigned to the communication request may also be elevated or enhanced based on the elevated user status. The incoming communication queue 120 may comprise the IVR queue as part thereof, therefore, allows the requests to be processed (e.g., answered) by agent 103 and/or agent 104 in an order of assigned priority. In some embodiments, if the request is processed by an agent without being serviced by the IVR system, then the request does not get queued into the IVR queue but gets dequeued from the incoming communication queue without entering the IVR system. The IVR system queue is a part of and associated with the incoming communication queue 120. As described in more detail below, the communication network module 131 comprise the incoming communication queue 120, comprising the associated IVR system queue, which may enable differentiation of different types of communication requests, such as personal and business calls. In some embodiments, requests within the incoming communication queue 120, comprising the associated IVR queue may be reordered or reassigned for processing. Furthermore, agents 103-104 may process any request within the incoming communication queue 120, regardless of the order of registration or the assigned priorities. Accordingly, the communication network module 131 comprising the queue 120, the incoming communication queue and the associated IVR system queue provide total control of incoming transaction processing.

Figure 2A:
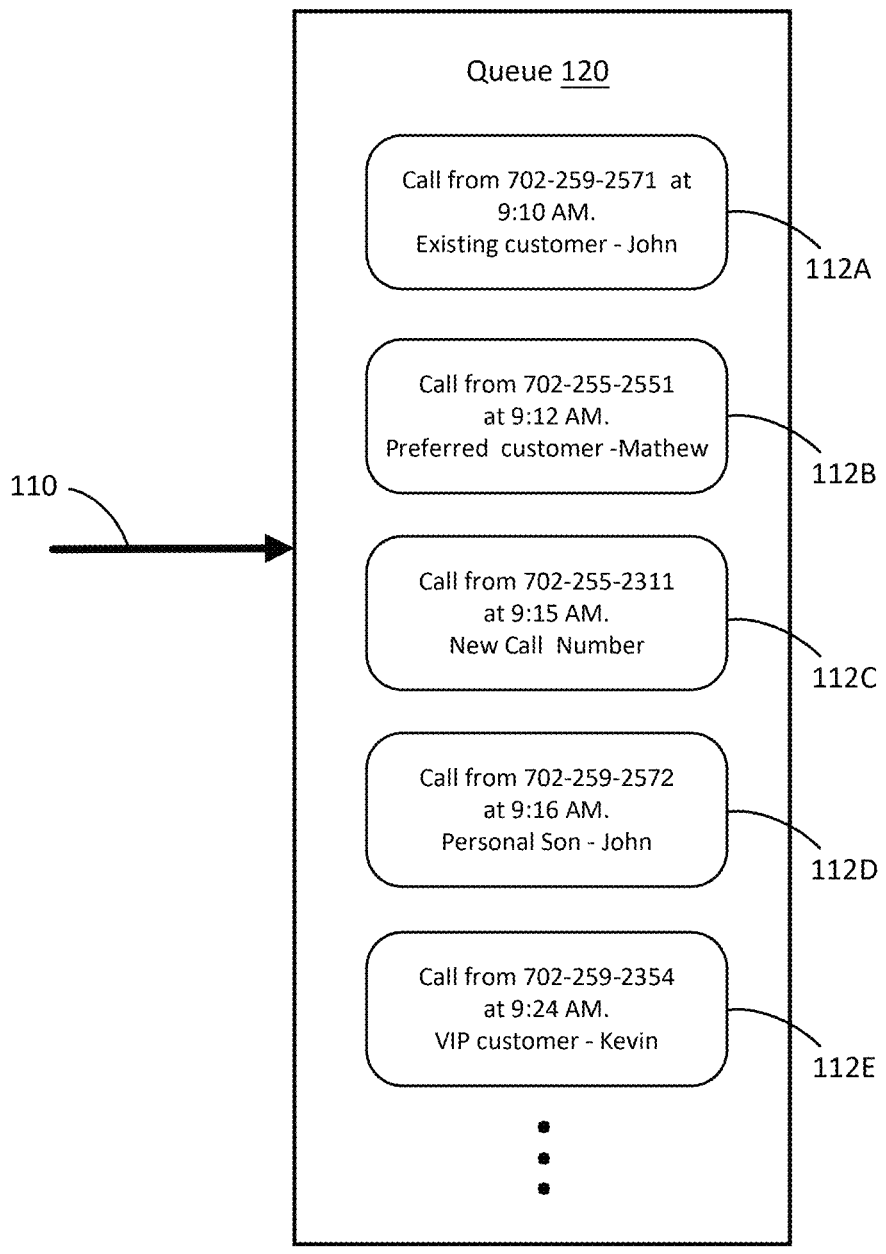
FIGS. 2A-2C are diagrams illustrating an example of the incoming visual queue according to an embodiment.
Figure 2B:
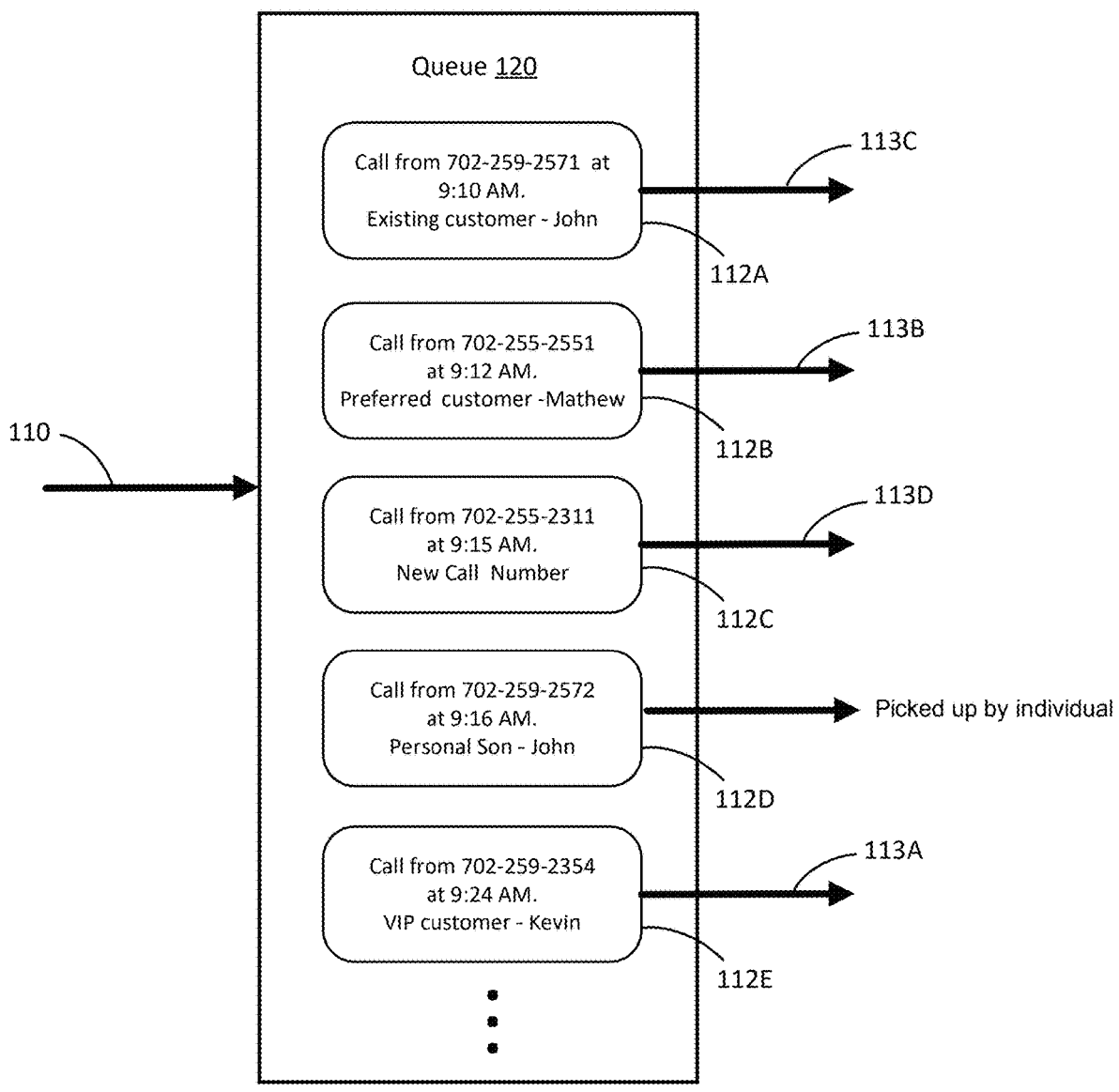
Figure 2C:
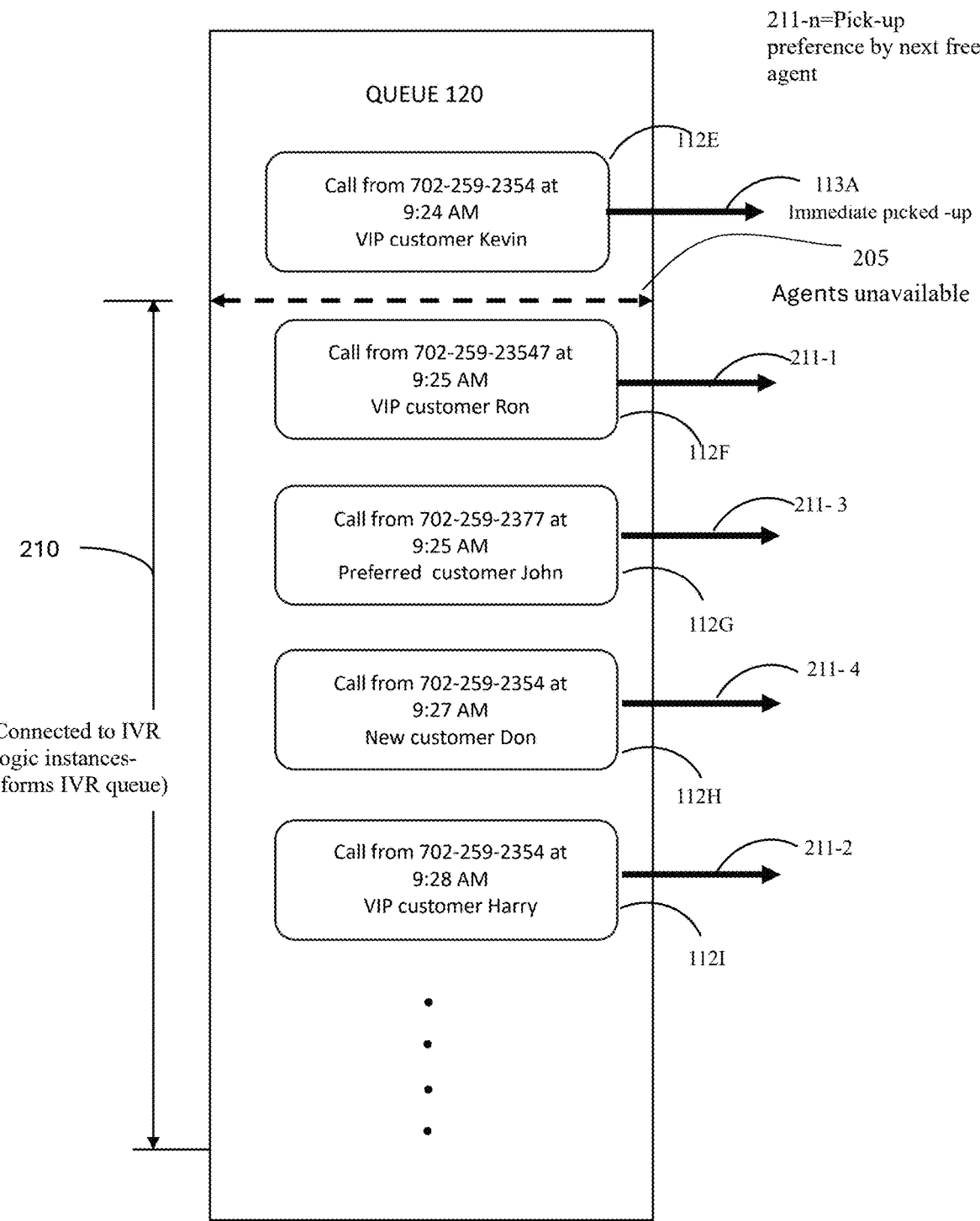

FIGS. 2A-2C are diagrams illustrating an example visual incoming communication queue according to an embodiment. In some embodiments, queue 120 may be an incoming communication queue 120, comprising the associated IVR system queue that enables an enterprise to prioritize incoming communication requests based on enterprise internal requirements and connection priorities.

Referring to FIG. 2A to 2C, an incoming communication or connection request 110 (e.g., phone call, text message, etc.) from a user device (e.g., user device 105) may be received into the incoming communication queue 120, in the communication network module 131. If no agent (e.g., agent 103 or 104) is available to process (e.g., answer) request 110, module 131 may queue request 110 into an IVR queue 210 within the incoming communication queue 120 retaining the status and the order of receipt. As shown in FIG. 2A to 2C, the incoming communication queue 120 may include a collection of communication requests, e.g., communication requests 112A-E that had available agents to dequeue and pick up the connections and 112F to 112I that did not have free agents as indicated in FIG. 2C (205), are each connected to an instance of the IVR code and retained in the IVR queue 210 that is part of the incoming communication queue 120. All the connected calls, including those connected to the IVR code that are active are stored and maintained in a sequential order. Request 110 may be one of requests 112A-E. The incoming communication queue and any communication request in the IVR queue may retain the enhanced status associated with the communication request 110 and allow the full visibility to the agents for access and dequeuing the communication request 110.

In an embodiment, requests 112A-E may be stored in the incoming communication queue 120 in the sequence they are received with visible enterprise-based enhanced priority settings. The priority settings, as shown in FIGS. 2A-2B, may include a user status, e.g., VIP customer, preferred customer, existing customer, or new call/phone number. Multiple communication requests (e.g., requests 112A-E) may be logged or queued into the incoming communication queue 120 at one time, though the visible priority settings may allow the requests to be processed or serviced (e.g., picked up) in order of the visible priority or based on any of the specific priority of the enhanced priority by an available agent.

In some embodiments, a user with a certain role in an enterprise (e.g., a manager) may override the priority settings and access the communication request (e.g., a call) even though the communication request of such communication has been processed by an agent. In an embodiment, the status settings in the incoming communication queue and the IVR queue may also enable the differentiation of different types of communication requests, e.g., personal communication request 112D and business communication requests 112A-C, E. In this example, the personal communication request 112D may only be processed (e.g., answered) by a user or individual to whom the request is addressed.

FIG. 2B illustrates a processing sequence of communication requests (e.g., requests 112A-E) based on set priorities. The priorities may be set based on user statuses as shown in the example in FIG. 2B, or any of the component of the enhanced user status. As described, personal communication request 112D may be processed by the user to whom it is addressed. The remaining non-personal (business) communication requests, e.g., requests 112A-C, E, may be processed based on assigned priorities 113A-D. For example, in queue 120, request 112E may have the highest priority due to its user status being a VIP customer. The second highest priority may be request 112B as its user status is preferred customer. The third highest priority may be request 112A as its user status is existing customer. Request 112C may have the lowest priority since its user status is a new (unknown) number. Accordingly, priorities 113A-D may define a processing order of requests 112A-C, E. In other words, request 112E may be processed first, request 112B may be processed second, request 112A may be processed third, and request 112C may be processed last. The processing order may continuously be updated as additional communication requests, with priorities assigned based on their user statuses, are queued into queue 120. In an embodiment, the priorities may be predefined or pre-assigned in the priority settings, as previously described. The user statuses, e.g., existing customer, preferred cus- ⁵ tomer, VIP customer, personal, new (unknown) number, etc., may be predefined by the enterprise as user information is collected.

Referring back to FIG. 1, in an embodiment, connection manager 132 may determine if a free agent exists who can respond to a communication request registered in the incoming communication queue 120, (e.g., a call) from user device 105 and connect the request to the available agent (e.g., agent 103 or 104). The connection manager 132 may make the call request visible to all agents available and allow for response by any available agent. If no agents are available, then the request may be routed to and handled by an IVR system queue and connected to an instance of the IVR code to respond to the call until an agent is available. The request may be routed or entered into the IVR system queue with the enhanced assigned priority as per the incoming communication queue 120, to enable the request to be processed based on the priority established or assigned by the enterprise. The connection manager 132, therefore, may serve to reduce the communication time user 101 (e.g., customer) communicating with the enterprise stay on the IVR system and enable any suitable and available agent to process the incoming request based on enterprise assigned priority settings. The connection manager 132 may also allow supervisory overview and access to all incoming communication requests.

In an embodiment, web service 133 may serve to generate a web resource identifier (e.g., URL) pointing to a dynamic transcript. For example, web service 133 may generate the web resource identifier by combining components, such as a protocol (e.g., HTTP or HTTPS), a domain name, and/or a path. The protocol may specify how a browser (e.g., Safari, Chrome, Edge, etc.) should fetch a resource (e.g., http:// or https://). The domain name may identify a specific web server (e.g., www.webserver.com). In an embodiment, the browser may use a domain name system (DNS) to translate the domain name into an Internet Protocol (IP) address, which may be a numerical address of the web server. The path may indicate a specific location of the resource on the web server (e.g., /about.html).

As described, the dynamic transcript may automatically be generated and transmitted in real-time to the participants of the communication (users and agents) at completion of the communication. The web resource identifier may be provided as a communication receipt to enable the participants to access the dynamic transcript through a website, where the dynamic transcript may provide complete or additional details of the communication. The web resource identifier may act as a trigger that enables multimedia access of the dynamic image via a mobile messaging service (e.g., SMS, MMS, etc.), other messaging platforms such as WhatsApp©, Telegram®, Skype®, Discord®, Viber®, Signal®, etc., or social media platforms such as Facebook®, Instagram®, LinkedIn®, etc. The website accessed by the participants can provide real-time updates of the communication. The communication receipt (web resource identifier) can also provide the capability to the participants to review and follow up on the communication.

In an embodiment, data collector 134 may serve to collect initial data associated with the communication. Data collector 134 may collect initial information, such as pre-registration information required to authenticate user 101. User

101 may be a registered user connecting to system 102 using a phone service, messaging service (e.g., SMS, MMS, etc.), messaging platform (e.g., WhatsApp®, Telegram®, Skype®, Discord®, Viber®, Signal©, etc.) running on user device 105. In some embodiments, user 101 may use any registered user devices or a downloadable app running on a registered user device (e.g., device 105) to initiate a communication request to system 102. The initial information collected from user 101 may include the information required for authentication of user 101 and information necessary from user 101 for generation of a communication receipt.

In some embodiments, data collector 134 may invoke AI module 135 that generates a natural language prompt to request user 101 to provide initial information about the communication, which may include one or more names of user 101, a purpose of the communication (e.g., technical support, refund, cancel subscription, etc.), product information or details (e.g., product name, model number, serial number, etc.), etc. The natural language prompt may request the communication information by requesting user 101 to provide the communication information using, e.g., voice inputs, keypad inputs, etc., to select options from a menu in an app on user device 105.

In some embodiments, in a scenario where natural language, or a messaging service or platform, is used for communication, data collector 134 may designate the natural language and/or messaging service prompt, and data collector 134 may operate with AI module 135, which may include an AI-based data extractor and language converter, that may use the processing capability of an AI processor, designated as an AI and image processing capability with memory and processors available for all related applications, to initially convert the received natural language voice and text inputs including data into grammatically understandable standardized language format. As described in more detail herein below, this standardized voice and data may then be converted dynamically and in real-time to another (raster) image format (e.g., PNG, JPG, GIF image format), In an embodiment, AI module 135 may accept natural language inputs from user 101 and/or agents 103-104 and convert the inputs into a standardized format for conversion into text. AI module 135 may include a text-to-voice converter and/or voice-to-text converter that provide user 101 with automated voice prompts. If user 101 or user device 105 was previously registered with communication system 102, AI module 135 may retrieve some or all of the communication information automatically. For instance, AI module 135 may automatically detect the name of user 101 based on a user identifier (ID) of user 101, such as a caller ID (e.g., phone number). AI module 135 may detect the phone number of user device 105 and deduce that communication from user 101 is regarding a particular product. In this example, AI module 135 may provide a prompt (e.g., voice or text) to confirm whether the user 101 communicates regarding that particular product. For example, the prompt may include a message similar to "Hello User, I see you are calling from 123-456-7890. Are you calling regarding product XYZ?" If user 101 confirms and initiates the communication using an app on user device 105, AI module 135 can retrieve the user information from the app.

In some embodiments, AI module 135 may convert the information about the communication generated during the interaction between user 101 and AI module 135 into a human and machine readable (structured) format, such as a JavaScript Object Notation (JSON) or extensible markup language (XML) file, that can be used to generate a dynamic transcript and/or dynamic image. The format may allow for storing, sharing, appending information, searching, and/or tracking the information about the communication.

In an embodiment, image generator 136 may use the formatted data (e.g., JSON or XML file) to create a dynamic image. As described, the dynamic image may be used to generate a visual representation of a web resource identifier referencing the dynamic transcript. For example, image generator 136 may use an image template and the formatted data to generate a vector image in a vector image format, e.g., scalable vector graphics (SVG) format.

In an embodiment, data storage module 137 is responsible for storing data related to the communication between user 101 and agents 103-104. For example, data storage module 137 may store the formatted data (e.g., JSON or XML file), the vector image, and the raster image (OG supported image) into one or more data stores (not shown).

In an embodiment, image converter 138 may convert the vector image into a raster image with a raster image format (e.g., PNG, JPG, GIF, etc.). For example, image converter 138 may execute one or more scripts to render the vector image on a browser, and a snapshot of the rendered vector image may be taken to convert the vector image into the raster image. The raster image format may be an OG supported format that can be used as the dynamic image.

As described, the dynamic image can be uploaded to a website associated with web service 133 and a web resource identifier (e.g., URL). The web resource identifier may serve as a token associated with a dynamic transcript that is sent to all the participants of the communication (user 101 and agents 103-104) to provide access to the dynamic transcript. When the web resource identifier is accessed by the participants on their user devices (e.g., devices 105 and 123-124), the dynamic transcript can be rendered on those user devices enabling the participants the capability to review and initiate follow up of the original or previous communication. The dynamic transcript may also enable each participant to search for and access current and historical data on related transactions or communications via a web server and data storage module 137. The rendered dynamic transcript may provide hooks (e.g., related URLs and API) within a website to access additional multimedia sites for collecting additional information on related products and services, Having the dynamic and real-time generation of the dynamic transcript enables the participants to access, via the website, information and data on previous and current communications and modify/correct errors in the collected communication data during the communication and before the communication is completed.

In an embodiment, I/O module 139 may enable a system administrator of communication system 102 to monitor, maintain and/or upgrade the operations of communication system 102. For example, I/O module 139 may be configured for administrative access for monitoring, and system updates which allow the operations of system 102 to be monitored and corrected if problems are detected. It may also enable system software updates of system 102 when they are available. In an embodiment, I/O module 139 may comprise secure connectivity for remote monitoring and update of system 102.

In an embodiment, UI service 140 is responsible for providing UI data to agent devices (e.g., devices 123-124), where each agent device may utilize the UI data to generate and display the registered communication requests in the incoming communication queue 120. The UI data may include data related to communication requests, such as a user identifier (e.g., phone number), time a communication request is received, name of the user, user status (which may be enhanced), etc. The UI data may be structured or unstructured. In one embodiment, the UI data may be stored in a queue data structure on the agent's device, the queue data structure having a number of queue elements. Each queue element may store data related to a communication request.

It is noted that while system 100 shows one user device 105 associated with users 101 and two agent devices 123-124 associated with agents 103-104, embodiments of the application are not limited to this example. In other words, any number of user devices, agent devices, users, and agents may be part of system 100.

Figure 3A:
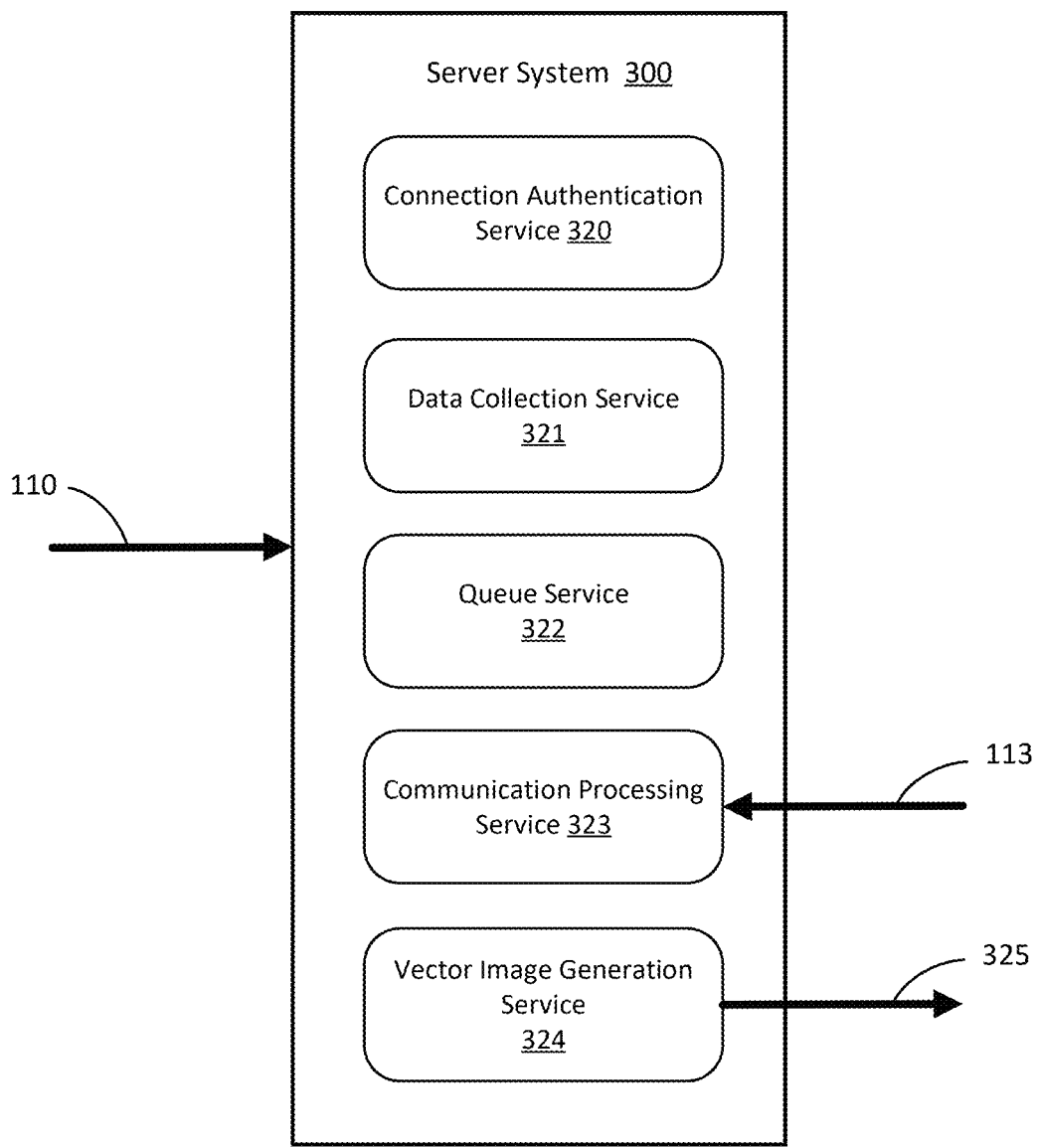
FIGS. 3A-3B are diagrams illustrating an example server system that creates a communication receipt based on a vector image according to an embodiment.
Figure 3B:
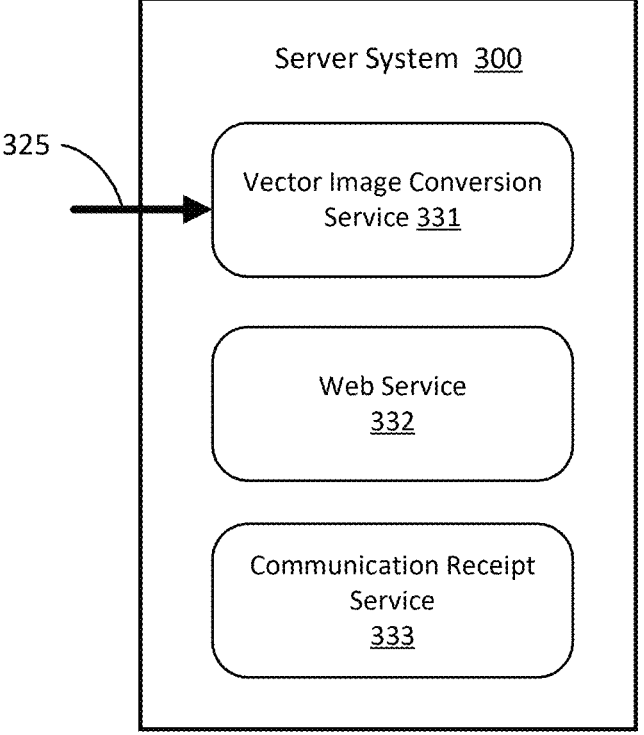

FIGS. 3A-3B are diagrams illustrating an example server system that creates a communication receipt based on a vector image according to an embodiment. In some embodiments, server system 300 may be implemented as part of communication system 102 of FIG. 1. As shown, server system 300 may include, but not limited to, connection authentication service 320, data collection service 321, queue service 322, communication processing service 323, vector image generation service 324, vector image conversion service 331, web service 332, and communication receipt service 333.

Referring to FIG. 3A, which illustrates the creation of a vector image file as a unique identifier and a token for a communication, communication or connection request 110 for a communication may be received by connection authentication service 320 from a user (e.g., customers). In some embodiments, connection authentication service 320 may be implemented as part of connection manager 132 of FIG. 1. Request 110 may be authenticated by connection authentication service 320 to allow connection to server system 300. Connection authentication service 320 may enable data collection service 321 (which may be implemented as part of data collector 134 of FIG. 1) to collect user data required for the generation of a unique identifier of the communication, initiated by request 110, in the form of a vector image file, which may be in a vector image format such as SVG. Queue service 322 may place request 110 into an incoming communication queue that has a IVR system associated with it (e.g., queue 120) and using an auto logic assign enhanced priorities that may be visible to all agents (e.g., agents 103-104) to enable any available/free agent to process request 110 based on the priorities, which may be setup or predefined by an enterprise. Communication processing service 323 (which may also be implemented as part of connection manager 132) may directly enable an available free agent to immediately dequeue the request 110 from the incoming communication queue without the request 110 accessing the associated IVR system and process the request 110 based on the priority 113 of the request 110 or on a priority based on a component of the enhanced status of the communication request 110 in the incoming communication queue 120. As an example, priority 113, for example, may be any of the assigned priorities 113A-E, as previously described. Communication data collected, with user information of the user, agent information of the agent, and information of a web server assigned to handle the communication may be used by vector image generation service 324 to generate a vector image file 325 that may be served as the unique identifier and token for the transaction. The token may contain the information of the web server that is responsible for handling the communication in its entirety. The vector image file 325 may be provided to vector image conversion service 331 (described below) to convert it into an image format, such as a raster image format (e.g., PNG, JPG, etc.) suitable to be used to generate a thumbnail, such as an OG supported image, to preview a webpage. The thumbnail may be displayed on a user device and/or agent device when a link to the webpage is shared, for example, via text messages or on social media platforms, such as Facebook®, LinkedIn®, X®, etc.

Referring now to FIG. 3B, which illustrates the creation of a meta tag of a digital communication receipt and associated web resource identifier to be sent to all the participants of the communication (e.g., user and agent) to dynamically render the digital communication receipt on a user device, e.g., user device 105 of FIG. 1, and agent device, e.g., agent device 123 or 124 of FIG. 1. As shown, vector image file 325 may be provided to vector image conversion service 331. Vector image conversion service 331 may convert the vector image file 325 into a raster image with a raster image format (e.g., PNG, JPG, GIF, etc.). For example, service 331 may execute one or more scripts to render the vector image file 325 on a browser, and a snapshot of the rendered vector image may be taken to convert the vector image file 325 into the raster image. The raster image format may be an OG supported format that can be used as the digital communication receipt. The raster image may be the dynamic image, as previously described.

In an embodiment, the raster image may be provided to web service 332 and service 332 may create a web resource identifier (e.g., URL) pointing to or referencing the raster image. Service 332 may add the web resource identifier that points to the raster image to a head section of the website hosting the dynamic transcript as part of meta tag information of the website (e.g., OG tag). Embodiments of the dynamic transcript have been previously described, and for brevity's sake, will not be described again herein. In addition to the web resource identifier pointing to the raster image, service 332 may also create a web resource identifier that points to the website hosting the dynamic transcript, as previously described.

In an embodiment, communication receipt service 333 may operate with service 332 to send or share the web resource identifier that points to the website hosting the dynamic transcript to the participants of the communication (user and agent). When a participant accesses the web resource identifier, the user or agent device of the participant may obtain or fetch website data (or metadata) of the website. For example, the device may read meta tag information (e.g., OG tag) from the website and obtain or retrieve the raster image through the web resource identifier that points to the raster image. The raster image may be dynamically rendered on the device, as a communication receipt, providing a communication summary of the communication. The communication summary may include names of the user and agent, name of a business, purpose of the communication, date and time of the communication, etc.

FIG. 4 is a flow diagram illustrating an example process of processing communication requests according to an embodiment. Method 400 may be performed by processing logic that may comprise hardware (circuitry, dedicated logic, etc.), software (such as is run on a general purpose computer system or a dedicated machine), firmware, or a combination. In one embodiment, the method 400 is performed by communication system 102 of FIG. 1.

Referring to FIG. 4, at block 410, communication requests may be received from user devices of users (e.g. user device 105), where the communication requests may comprise respective user statuses. The incoming communication requests with the respective user status are registered into and saved to an incoming communication queue (also called an input queue). The incoming communication queue and the details of the requests stored therein are fully accessible to all agents, whether active or not. The incoming communication queue may have an auto logic that operates to enhance the user status and priority of the communication request that may be based on multiple criteria set up by the enterprise. For example, based on collected data (e.g., data collected by data collector 134 of Figure) that includes initial information about the communication, the auto logic may determine that the communication request is critical and needs expedition. As such, the auto logic may elevate the user status from a lower level to a higher level (e.g., from existing or preferred customer to VIP customer). Accordingly, the priority level assigned to the communication request may also be elevated or enhanced based on the elevated user status. The incoming communication queue is coupled to a IVR system comprising replicable IVR logic. At block 420, for each communication request(s), it may be determined whether at least one agent is available to service the communication request(s), if it is determined that at least an agent is available, the agents are enabled to dequeue the communication requests in an order of established priority based on the user status or one of the enhances status criteria to service the request.

At block 430 in response to determining that all agents are busy and no agent is currently available to service the incoming communication request(s), each of such communication request(s) received and registered into the incoming communication queue are connected to an instance of the IVR logic. These are left in the incoming communication queue which then acts concurrently as an IVR queue, which is part of the incoming communication queue, for the IVR logic connected communication requests. The communication requests in the incoming communication queue comprising the IVR queue, retains the user status information and the enhanced priority information. The communication requests in the incoming, including the IVR queue also remain fully accessible to all agents.

At block 440, in response to determining that at least one, previously engaged agent is available to service the communication request(s), the communication request(s) may be dequeued from the queue based on an order of one or more respective priorities assigned to the communication request (s), and picked up by the at least the one agent to service the communication request(s).

FIG. 5 is a flow diagram illustrating an example process performed by the system 100 of FIG. 1 according to an embodiment. Method 500 may be performed by processing logic that may comprise hardware (circuitry, dedicated logic, etc.), software (such as is run on a general purpose computer system or a dedicated machine), firmware, or a combination. In one embodiment, the method 500 is performed by communication system 102, user device 105, agent device 123 and/or agent device 124.

Referring to FIG. 5, at block 501, an incoming communication request may be received. For example, user 101, via user device 105, may contact communication system 102 to initiate a communication. At block 502, action for connection approval and data collection may be initiated. For example, communication system 102 may initiate an action to check user information of user 101, e.g., the name of the user, and the registration status of the communication network module 131 for providing connection approval using connection manager 132. The connection manager 132 may connect user 101 to an IVR system, and initiate data collection for generation of a communication receipt and/or dynamic transcript.

At block 503, data on user information is collected. For example, communication system 102 may collect the data and information needed to generate the communication receipt, such as company name, user identification comprising name and contact number, etc., topic of the transaction, date and time and any other information required for the communication receipt. In an embodiment, the user information, e.g., company name, username, user contact number, etc., may be previously stored by the communication system 102 when the user registered with the system. Agent information of the agents may also be previously stored by communication system 102 when the agents registered with the system. The initiation of the communication and collection of data may be performed by a session initiation protocol (SIP), a protocol for initiating, managing and terminating multimedia sessions, such as telephone calls, video calls, and/or instant messaging. SIP may be associated with media applications, and when used associated with media applications, is designated as SIP media applications (SMA). SMA may be found as part of Amazon chime SDK and works with AWS lambda functions running proprietary code to handle the communications and function dynamically and in real-time to collect the data of the communication. The SMA can be programmed to direct the incoming communication requests after authentication and collection of data to the IVR system or an agent.

At block 504, the communication request may be connected to an agent. For instance, the SMA operating with the IVR system, based on the connection information and priorities of the enterprise, may enable connection of the user to a first available responding agent suitable to handle the communication request. The dynamically collected information and data available to the communication system 102 at this stage may include all that is necessary for generation of the communication receipt that forms a summarized visual reference and include, for example, a company name, agent name, topic to be covered, contact number, date and time of the communication (e.g., call), etc.

At block 505, a dynamic image framework for the communication may be generated. For example, communication system 102, using available processing power, may generate a dynamic image framework in vector image format (e.g., SVG) by inserting the collected information and data into a custom framework for the communication. The generated vector image file may include the collected data and the name of the agent and serve as a unique token referencing to the communication. The token created may encode a web server responsible for managing the communication including the information of the communication. The vector image file may be an initial file used as a basic identifier for the communication. The vector image file can be converted into a raster image format, such as PNG or JPG format, suitable for use as an OG supported image and sent to the web server with the generated token. The token may be used to generate a dynamic web resource identifier (e.g., URL) that includes the token reference of the communication and also references an OG supported image. The OG supported image may be accessed or obtained by adding a meta (<meta>) tag with OG properties to the head (<head>) section of the HTML of the image file, specifying the URL that includes the token reference of the image. The dynamic URL of this OG supported image within the custom framework may form the communication receipt and may be the image for accessing the details of the communication from the web server. The OG supported image, and the token may be uploaded onto the responsible web server system. The dynamic URL comprising the token reference may be sent to the participants of the communication through a messaging service (e.g., SMS, MMS, etc.) or a messaging platform (e.g., WhatsApp, Telegram, Skype, Discord, Viber, Signal, etc.) for the user and agent devices to access the dynamic OG supported image and access and review the record or transcript of the communication. The URL may be uploaded to an approved hosting server so that any participant (user or agent) accessing the URL may cause the dynamic and real time updating image of the communication to be rendered on the accessing device, for review.

At block 506, data on the communication between the user and agent may be dynamically collected. For example, communication system 102 may dynamically and in real-time collect data and information on interaction during the communication between the initiator (user) and the responding agents in natural language and messaging formats. This collected information and data when accessed using the communication receipt may provide the user and agent the capability to view in real-time the communication as it happens, as described above. The dynamic processing of the collected ongoing communication information is described herein below.

At block 507, the collected data may be converted into an OG supported image. For example, the dynamically and real-time collected information and data of an ongoing communication may be collected as natural language and messaging based interaction information of the communication between the initiators (users) and the responding agents. These may be converted into formal language using processing power available via processors, using AI module 135 with machine learning (ML) capability that is integrated into the SMA within the communication system 102. The integrated AI with ML capability may include the capability to convert text-to-speech (TTS), speech-to-text (STT), voice analytics and transcription from speech-to-text. There are multiple programs available for transcription from speech-to-text, such as Amazon Transcribe that is integratable with Amazon Web Services (AWS), Cokatoo, Otter.AI, Apple Dictation, or Google Doc Voice typing. In some embodiments, Amazon Transcribe may be integrated into the SMA. The dynamically collected and manipulated formal language data and information may then be converted into an image format, such as a .PNG format, suitable for storage and conversion to an OG supported image on the web server system responsible for managing the communication. The program for converting the text to image used may be a dedicated program or a commercially available program similar to a small SEO tool's text to image converter or an online .PNG maker.

At block 508, the OG supported image may be generated for a communication receipt. For example, the web server system responsible for managing the communication may accept the dynamic and real-time image received and store the image data. The web server may then be enabled to deliver the image data of the entire communication as an image rendered on a user device (e.g., user device 105) using the communication receipt to access the entire communication dynamically and in real-time. The dynamically collected and transferred image data of the entire (detailed) communication may be rendered and displayed on the user device when the user accesses and selects (e.g., clicks or taps on) the communication receipt that is provided as the original OG image. The rendered image of the entire communication may be provided as a searchable and storable dynamic image associated with the communication receipt on the user device used for accessing the entire communication. The completed data of the communication may also be stored in the data store as a historical file for future access and use.

At block 509, a web resource identifier (e.g., URL) referencing the OG supported image may be generated. For example, the OG supported image used as the communication receipt may comprise the initially collected data and the token referenced by the URL. When the dynamic URL received over the messaging system is accessed on a device, the responsible web server may decode the URL to extract the token reference. The token information may be used by the web server to determine if it is the specific web server responsible to handle the transaction. If the web server is verified as being responsible for the communication, the web server can dynamically, and in-real time generate an HTML response to the URL which can embed the image resource URL within the HTML header. The pages of the URL may be dynamically created on-the-fly referencing the OG supported image once the response URL is validated. The dynamically collected interaction information between the users and agents available as an image may be used, for example by web service 133, to render that image on the user device accessing the communication details using the communication receipt. The rendered image provides a dynamic and searchable OG supported image of the data and the interaction as it happens.

At block 510, the web resource identifier may be sent to participants. For example, a message in one of the applicable message formats may be sent to the devices of all the participants (e.g., user device 105, agent devices 123-124) approved to review the communication at the end of the communication again with the URL. The URL may enable the participants and participants with certain role (e.g., management) to access the entire communication details (which may be part of the dynamic transcript, as previously described) on their respective web browsers for review and follow up. The web access using the communication receipt may also enable the participants to further access any historical related communication data.

At block 511, access to the communication may be provided via the OG supported image for the communication receipt rendered on devices of participants. For example, the communication receipt comprising the OG supported image (raster image previously described), when accessed by a participant, may also be enabled to provide hooks or related URL information to related multimedia websites for the participants to access a specific website that hosts the communication details and provide additional details and information regarding products and services covered in the communication.

At block 512, information (details) of the communication may be accessed during an active communication. For example, since the operation is a dynamic and real-time operation, the availability of the URL during the active communication may enable the participants to access the active communication as it happens, even before completion of the communication, for review and correction of errors or problems from their web browsers using the provided URL.

Figure 6:
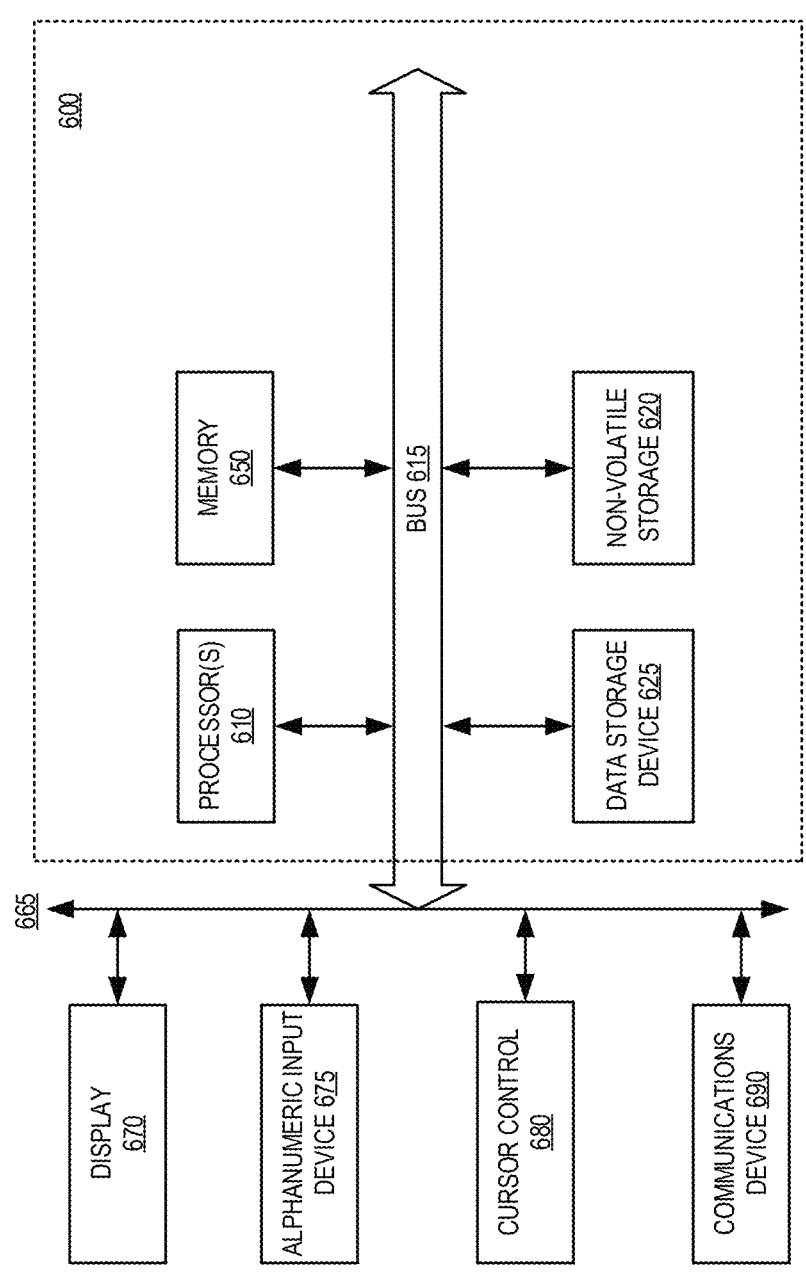
FIG. 6 is an embodiment of a computer system that may be used to support the systems and operations discussed herein.

FIG. 6 is an embodiment of a computer system that may be used to support the systems and operations discussed herein. The data processing system illustrated in FIG. 6 includes a bus or other internal communication means 615 for communicating information, and one or more processors 610 coupled to the bus 615 for processing information. The system further comprises a random access memory (RAM) or other volatile storage device 650 (referred to as memory), coupled to bus 615 for storing information and instructions to be executed by processor(s) 610. Main memory 650 also may be used for storing temporary variables or other intermediate information during execution of instructions by processor(s) 610. The system also comprises a read only memory (ROM) and/or static storage device 620 coupled to bus 615 for storing static information and instructions for processor(s) 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor(s) 610. An additional user input device is cursor control device 680, such as a touchpad, mouse, a trackball, stylus, or cursor direction keys coupled to bus 615 through bus 665 for communicating direction information and command selections to processor(s) 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read-only memory 620 and executed by processor(s) 610. This control logic or software may also be resident on an article of manufacture comprising a computer readable medium having computer readable program code embodied therein and being readable by the mass storage device 625 and for causing the processor(s) 610 to operate in accordance with the methods and teachings herein.

The embodiments discussed herein may also be embodied in a handheld or portable device containing a subset of the computer hardware components described above. For example, the handheld device may be configured to contain only the bus 615, the processor(s) 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include processor(s) 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A computer-implemented method of processing communication requests, the method comprising:
   receiving a plurality of communication requests from a plurality of user devices of users;
   determining respective user statuses of the users for the plurality of communication requests:
   respectively assigning a plurality of priorities to the plurality of communication requests based on the respective user statuses of the users:
   queuing the plurality of communication requests with the respective user statuses of the users into an incoming communication queue;
   determining whether at least one agent of a plurality of agents is available to service the plurality of communication requests from the incoming communication queue;
   in response to determining that no agent of the plurality of agents is available to service the plurality of communication requests, respectively connecting the plurality of communication requests to a plurality of interactive voice response (IVR) instances; and
   in response to determining that the at least one agent is available to service the plurality of communication requests, dequeuing one or more communication requests of the queued plurality of communication requests from the incoming communication queue in an order of one or more priorities respectively assigned to the one or more communication requests, to service the one or more communication requests.

2. The method of claim 1, wherein a user status of a communication request in the incoming communication queue is enhanced from a first user status to a second user status.

3. The method of claim 1, wherein the plurality of communication requests that are connected to the plurality of IVR instances form an IVR queue within the incoming communication queue.

4. The method of claim 1, further comprising:
   connecting each of the dequeued one or more communication requests to an agent device of the at least one agent; and
   initiating a connection and communication between a user device of the plurality of user devices and the agent device of the at least one agent that services the dequeued communication request.

5. The method of claim 1, wherein dequeuing the one or more communication requests from the incoming communication queue comprises:
   dequeuing a first communication request from the incoming communication queue, wherein the first communication request has a first assigned priority; and
   dequeuing a second communication request from the incoming communication queue, wherein the second communication request has a second assigned priority;
   wherein the first priority is a higher priority than the second priority.

6. The method of claim 1, wherein the incoming communication queue is displayed on a plurality of agent devices of the plurality of agents.

7. The method of claim 1, wherein each communication request further comprises at least one of a user identifier, a time the communication request is received, or a name of a user.

8. The method of claim 1, wherein each user status of the respective user statuses comprises an existing customer, a preferred customer, a new number, a personal user, or a VIP customer.

9. The method of claim 1, further comprising:
   determining that a first user status of a first communication request is a personal user; and
   connecting the first communication request to a device to which the first communication request is addressed.

10. The method of claim 1, wherein the plurality of communication requests are added to the incoming communication queue in an order the plurality of communication requests are received.

11. One or more non-transitory computer readable storage media having instructions stored thereupon which, when executed by a server system having at least a processor and a memory therein, cause the server system to perform operations, the operations comprising:
   receiving a plurality of communication requests from a plurality of user devices of users;
   determining respective user statuses of the users for the plurality of communication requests:
   respectively assigning a plurality of priorities to the plurality of communication requests based on the respective user statuses of the users:
   queuing the plurality of communication requests with the respective user statuses of the users into an incoming communication queue;
   determining whether at least one agent of a plurality of agents is available to service the plurality of communication requests from the incoming communication queue;
   in response to determining that no agent of the plurality of agents is available to service the plurality of communication requests, respectively connecting the plurality of communication requests to a plurality of interactive voice response (IVR) instances; and in response to determining that the at least one agent is available to service the plurality of communication requests, dequeuing one or more communication requests of the queued plurality of communication requests from the incoming communication queue in an order of one or more priorities respectively assigned to the one or more communication requests, to service the one or more communication requests.

12. The one or more non-transitory computer readable storage media of claim 11, wherein a user status of a communication request in the incoming communication queue is enhanced from a first user status to a second user status.

13. The one or more non-transitory computer readable storage media of claim 11, wherein the plurality of communication requests that are connected to the plurality of IVR instances form an IVR queue within the incoming communication queue.

14. The one or more non-transitory computer readable storage media of claim 11, wherein the operations further comprise:

connecting each of the dequeued one or more communication requests to an agent device of the at least one agent; and initiating a connection and communication between a user device of the plurality of user devices and the agent device of the at least one agent that services the dequeued communication request.

15. The one or more non-transitory computer readable storage media of claim 11, wherein dequeuing the one or more communication requests from the incoming communication queue comprises:

dequeuing a first communication request from the incoming communication queue, wherein the first communication request has a first assigned priority; and dequeuing a second communication request from the incoming communication queue, wherein the second communication request has a second assigned priority;

wherein the first priority is a higher priority than the second priority.

16. The one or more non-transitory computer readable storage media of claim 11, wherein the incoming communication queue is displayed on a plurality of agent devices of the plurality of agents.

17. The one or more non-transitory computer readable storage media of claim 11, wherein each communication request further comprises at least one of a user identifier, a time the communication request is received, or a name of a user.

18. The one or more non-transitory computer readable storage media of claim 11, wherein each user status of the respective user statuses comprises an existing customer, a preferred customer, a new number, a personal user, or a VIP customer.

19. The one or more non-transitory computer readable storage media of claim 11, wherein the operations further comprise:

determining a first user status of a first communication request is a personal user; and connecting the first communication request to a device to which the first communication request is addressed.

20. A server based interactive communication system, comprising:

at least one memory; and at least one processor coupled with the at least one memory and configured to perform operations comprising:

receiving a plurality of communication requests from a plurality of user devices of users;

determining respective user statuses of the users for the plurality of communication requests:

respectively assigning a plurality of priorities to the plurality of communication requests based on the respective user statuses of the users:

queuing the plurality of communication requests with the respective user statuses of the users into an incoming communication queue;

determining whether at least one agent of a plurality of agents is available to service the plurality of communication requests from the incoming communication queue;

in response to determining that no agent of the plurality of agents is available to service the plurality of communication requests, respectively connecting the plurality of communication requests to a plurality of interactive voice response (IVR) instances; and in response to determining that the at least one agent is available to service the plurality of communication requests, dequeuing one or more communication requests of the queued plurality of communication requests from the incoming communication queue in an order of one or more priorities respectively assigned to the one or more communication requests, to service the one or more communication requests.

* * * * *